(12) United States Patent
Moore et al.

(10) Patent No.: US 8,244,675 B2
(45) Date of Patent: Aug. 14, 2012

(54) METHOD AND APPARATUS FOR UPDATING A DATABASE USING TABLE STAGING AND QUEUED RELOCATION AND DELETION

(75) Inventors: John Walter Moore, Coppell, TX (US); Richard Bruce Gough, Richardson, TX (US); Jared Moran, Frisco, TX (US); Joseph Wenger, Grapevine, TX (US)

(73) Assignee: CA, Inc., Islandia, NY (US)

( * ) Notice: Subject to any disclaimer, the term of this patent is extended or adjusted under 35 U.S.C. 154(b) by 1486 days.

(21) Appl. No.: 11/134,030

(22) Filed: May 20, 2005

(65) Prior Publication Data
US 2005/0267914 A1  Dec. 1, 2005

Related U.S. Application Data

(60) Provisional application No. 60/573,060, filed on May 21, 2004.

(51) Int. Cl.
*G06F 7/00* (2006.01)
*G06F 17/00* (2006.01)
(52) U.S. Cl. ...................................................... 707/625
(58) Field of Classification Search ................. 707/625
See application file for complete search history.

(56) References Cited

U.S. PATENT DOCUMENTS

| 6,343,301 B1 | 1/2002 | Halt et al. ..................... 707/203 |
| 6,366,917 B1* | 4/2002 | St. John Herbert, III ............. 1/1 |
| 6,668,262 B1 | 12/2003 | Cook ............................ 707/204 |
| 2003/0135478 A1 | 7/2003 | Marshall et al. .................. 707/1 |

OTHER PUBLICATIONS

Paul Lane, "Oracle Database Data Warehousing Guide", Dec. 2003, 10g Release 1 (10.1) Sections 4, 12, 13, 14.*
Notification of Transmittal of the International Search Report and the Written Opinion of the International Searching Authority for International Application No. PCT/US2005/017802, filed May 20, 2005, (12 pages), Dec. 6, 2005.

* cited by examiner

*Primary Examiner* — Van Oberly
(74) *Attorney, Agent, or Firm* — Baker Botts L.L.P.

(57) ABSTRACT

Methods and systems for updating a database with one or more update records are provided in the present application. A staged table corresponding to a primary table of the database is generated. The update record is processed to validate the update record to determine whether there is an error in the update record and to add the update record to the staged table. The update record is copied from the staged table to the primary table when there is no error in the update record. The update record is deleted from the staged table after the update record is processed.

25 Claims, 6 Drawing Sheets

METHOD AND APPARATUS FOR UPDATING A DATABASE USING TABLE STAGING AND QUEUED RELOCATION AND DELETION

REFERENCE TO RELATED APPLICATIONS

The present specification is based on U.S. Provisional Patent Application No. 60/573,060 filed May 21, 2004, the entire contents of which are herein incorporated by reference.

TECHNICAL FIELD

The present application generally relates to methods and systems for adding and updating data in databases. The present application more specifically relates to a method and system for updating data on a plurality of database tables while allowing for error checking and avoiding memory drain in processing large update files.

BACKGROUND

Conventional database processing techniques typically verify the accuracy of data prior to making an update to the primary database. It is common practice that if during the verification process, any of the updates are found to be in error, the errors are reported and none of the modifications are made. For example, a collective group of updates can include the following: addition of new records to one or more database tables, creation ("add") of one or more new tables, deletion ("drop") of one or more existing tables, and change of a value already stored in one or more specific fields within one or more database tables.

For example, a relational database is commonly used as the primary data store for applications and other data consumers. Because the nature of a relational database is to link multiple tables through a system of dependencies, a single update to a single table will often require updates to each of the table's dependent tables. If an error is discovered while attempting to update one in a series of dependent tables, the tables that have already been updated must be restored to their prior state to avoid data instability.

Updates can involve thousands of records on multiple database tables. The shear size and complexity of such a database update creates problems with conventional means of data verification prior to update of the primary database. For example, the database feature known as "roll back" is widely used to return tables to their initial state if an error is discovered during an update that spans multiple tables. However, roll back is not an option with many commercially available databases when the database update becomes sufficiently large. This is because many databases have a feature known as "auto commit" that commits the updates to the database automatically after a set number of updates have been made. Another conventional technique for supporting verification during an update is to store all proposed updates in memory until the verification process is complete. This strategy has the disadvantage of tying up large amounts of system resources. This is especially true for large files containing many updates. The lack of system resources can in turn cause errors in application processing when sufficient memory is not available.

There is a need for a system and method for processing large update files that avoids the problems identified above.

SUMMARY

This application provides methods and systems for updating a database with one or more update records. A method for updating a database with one or more update records according to an exemplary embodiment of this application includes generating at least one staged table corresponding to at least one primary table of the database, processing the update record to validate the update record to determine whether there is an error in the update record and to add the update record to the staged table, copying the update record from the staged table to the primary table when there is no error in the update record and deleting the update record from the staged table.

An apparatus for updating a database with one or more update records according to an exemplary embodiment of this application includes a staged table device adapted to generate at least one staged table corresponding to at least one primary table of the database, a validating device adapted to process the update record to determine whether there is an error in the update record and to add the update record to the staged table, a copying device adapted to copy the update record from the staged table to the primary table when there is no error in the update record and a deleting device adapted to delete the update record from the staged table.

A method for updating a database with one or more update records according to another exemplary embodiment of this application includes providing a coordinator key to identify the update record, processing the update record to validate the update record and add the update record and the coordinator key to a staged table and copying the update record from the staged table to a primary table when the update record is successfully validated.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

This application provides tools (in the form of methods, apparatuses and systems) for updating a database with one or more update records. The techniques discussed in this application allow database updates using client defined, un-validated, interpreted input in a batch or subtasked environment. Through the methodology disclosed in this application, a staged set of database tables can be updated prior to the update of the primary set of database tables. A verification process is performed while loading the updates on the staged tables. This methodology prevents record updates from being made on the primary database until verification is complete while also eliminating the overhead of maintaining the updates in memory during the update process. If the updates do not generate an error in the staged environment, they are committed to the primary database tables and the staged data is deleted.

In describing the preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The methods and apparatuses of this application may be implemented in the form of a software application running on a computer system such as a mainframe, personal computer (PC), handheld computer, server, etc. The computer system may be linked to a database or various types of storage media. The link may be, for example, via a direct link such as a direct hard wire or wireless connection, via a network connection such as a local area network, or via the Internet.

Figure 1:
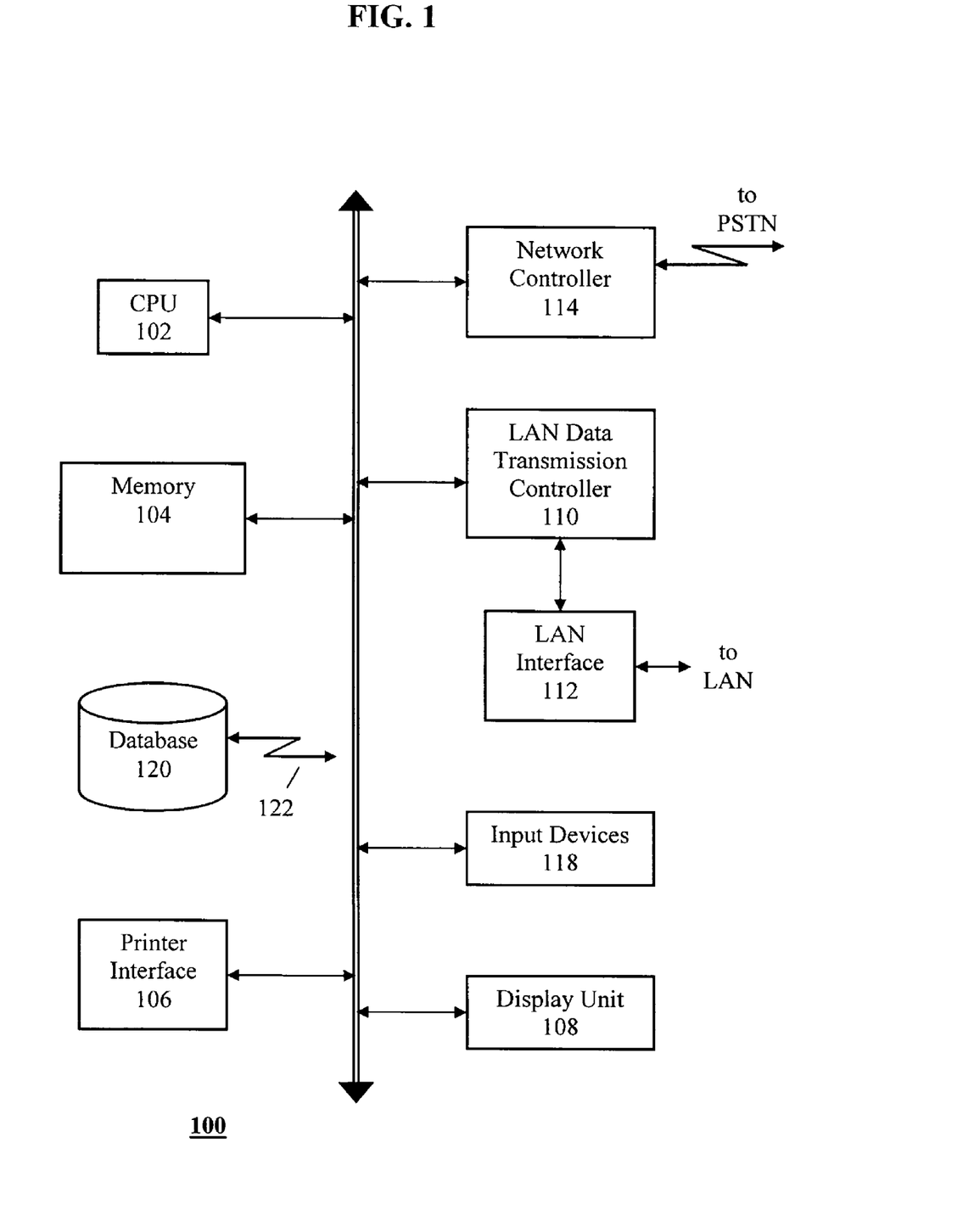
FIG. 1 shows an example of a computer system capable of implementing the method and system of the present disclosure.

An example of a computer system capable of implementing the methods and apparatuses of this application is shown in FIG. 1. The computer system referred to generally as system 100 may include a central processing unit (CPU) 102, memory 104, a printer interface 106, a display unit 108, a LAN (local area network) data transmission controller 110, a LAN interface 112, a network controller 114, an internal bus 116, a database 120 and one or more input devices 118 such as, for example, a keyboard, mouse, etc. Naturally, other components may be included in the computer system 100 and some components may not be present.

Figure 2:
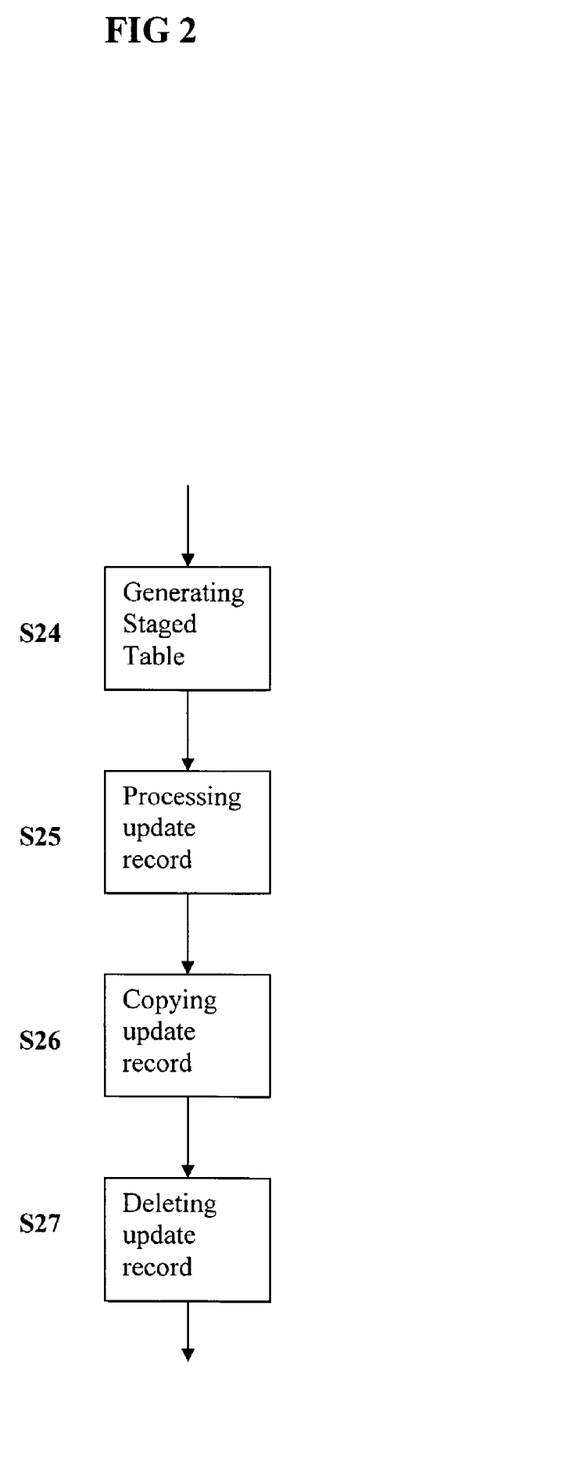
FIG. 2 shows a flow chart of a method for updating a database with one or more update records according to an exemplary embodiment of this disclosure.

A method for updating a database with one or more update records, according to an exemplary embodiment of this application, is discussed below with reference to FIG. 2. At step S24, one or more staged tables are generated to correspond to one or more primary tables of the database. An update record is processed at step S25 to validate the update record to determine whether there is an error in the update record and to add the update record to the staged table along with the coordinator key. At step S26, the update record is copied from the staged table to the primary table when there is no error in the update record. At step S27, the update record is deleted from the staged table.

A user may input one or more update records. As noted above, update records may indicate addition or deletion of one or more records in an existing table, modification of a value in one or more fields in an existing table or tables, and/or addition of or subtraction of one or more tables, for example. Update records are preferably entered via an update record file, which may include a single update record or more commonly, a plurality of update records. The update records may be entered into the update record file via a text editor, for example. In such a case, the update records may not be immediately validated. The update record file may include thousands of update records and the update records may define thousands of database entries, or updates.

A coordinator key can be generated to uniquely identify the update record or records that have been input. Since the coordinator key defines a unique value that identifies all the update records in a single processing of an update record file, all records added to the staged tables by processing this one update record file will have the same coordinator key value. In one exemplary embodiment, the creation of this key value can be derived from a clock value to make it unique. This allows for all the records added in a given collection of update records to be easily identified.

In step S24 one or more staged tables are generated. In a preferred embodiment, the staged tables are the same as and correspond to one or more primary tables that are to be updated with the update records. In one example embodiment, both the primary tables and the staged tables are relational databases. Alternatively, other database structures such as hierarchical databases and others may also be used.

Figure 3:
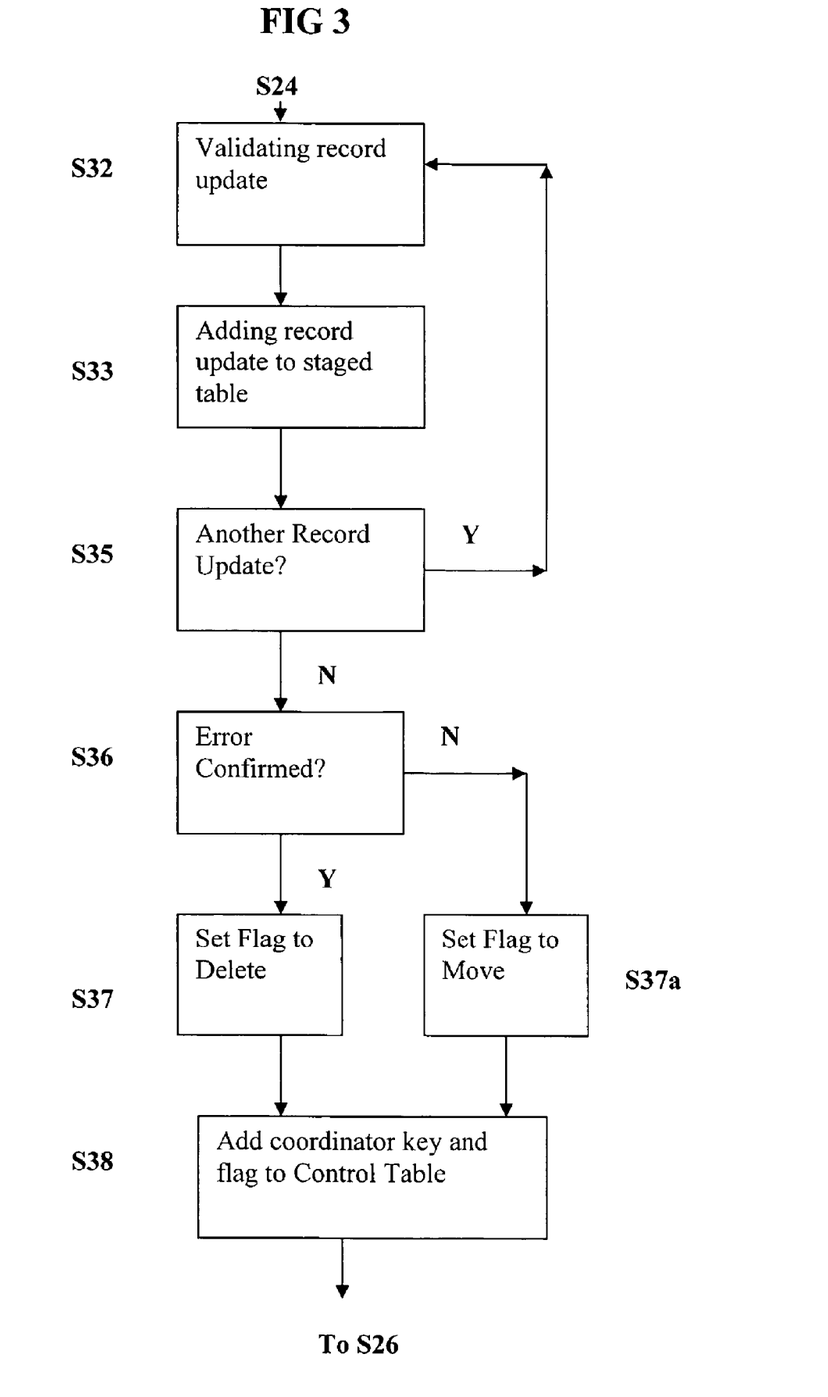
FIG. 3 shows a flowchart corresponding to a processing step in the method illustrated in FIG. 2.

The processing of update records in step S25 is discussed in further detail with reference to FIG. 3. In step S32, the update record is validated, that is checked for errors. An error flag may be generated if an error is present. Thereafter, at step S33, the update record is added to the staged table or tables along with the coordinator key associated with the update record. The update record may also be formatted for entry into a database environment as well, if necessary. In a preferred embodiment, processing continues until all update records of a particular update record file are processed and added to the staged tables. In this case, a decision is made at step S35 as to whether there are additional update records in the update record file. If so ("Y" at step S35) the method returns to step S32 and the next update record is processed as described above. If no further update records are present ("N" at step S35) the method continues to step S36.

In step S36, any error flags generated in step S32 are examined to confirm the presence of the error. If no error has been detected ("N" as S36), in step S37a, the coordinator key for the update record or records is added to a control table along with a flag indicating that the update record or records should be moved to the primary file in step S26. For example, the flag may be set to "Move" if no error was detected in the update record or records. If an error is confirmed while processing the update record ("Y" at step S36), in step S37 the coordinator key for the update record or records is added to the control table. However, a flag is set to indicate that the update record or records in the staged tables should be discarded. For example, if an error is detected, the flag is set to "Delete." The flag and corresponding coordinator key are added to the control table in step S38.

Figure 4:
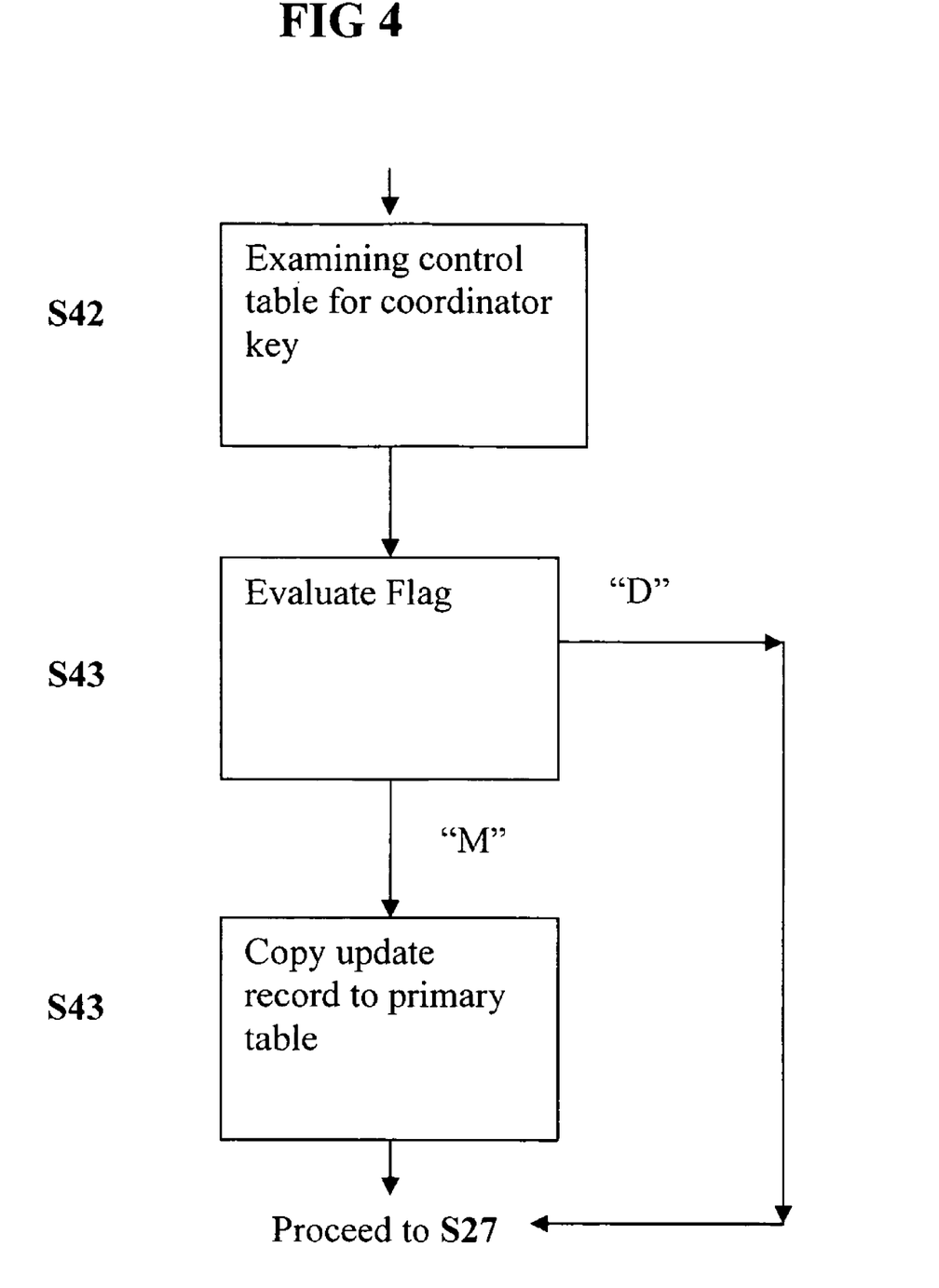
FIG. 4 shows a flowchart corresponding to a copying step of the method illustrated in FIG. 2.

The copying of step S26 is discussed in further detail with reference to FIG. 4. At step S42 the control table mentioned above is examined for coordinator keys. At step S43, the flag associated with the coordinator key is evaluated to determine whether it is a "move" flag or a "delete" flag. If the flag is a "move" flag ("M" at step S43) then all update records in the staged table or tables associated with the coordinator key are copied from the staged table or tables to the primary table or tables in step S44. If the flag is a "delete" flag ("D" at step S43) the process proceeds to step S27.

At step S27, the update records associated with the coordinator key are deleted from the staged tables. Where the flag associated with the coordinator key is a "move" flag, deletion occurs only after the update records associated with the coordinator key are copied to the primary tables in step S26. Where the flag associated with the coordinator key is a "delete" flag, the deletion of the update records associated with the coordinator key occur without the copying in step S26. By deleting update records from the staged tables after they have been copied to the primary tables or the decision to discard them has been made, the resources used by the staged table are minimized.

In a preferred embodiment of the present application, the copying step S26 may be implemented in a separate subtask, called for example "Relocated," in which the subtask periodically examines the control table to look for coordinator keys related to staged records to process. In this embodiment, the only records in the control table are update requests. When a such a record is found, the request type or flag is checked to determine whether it has the value of Move or Delete. The coordinator key is used to identify the record updates in the staged tables to which the request corresponds. For a Move request, each record in the set of staged tables that matches the coordinator key is read from the staged table, and added to the corresponding primary table at step S26. The moved record update may then be deleted from the stage table.

For a Delete request, the update records in the staged tables that match the coordinator key will be read and deleted, without moving them to the primary tables.

The use of the control table and the "Relocator" subtask prevent processing delays by allowing a subsequent update record file in a series of update record files to be processed in the staged area asynchronously with processing in the primary database. Since all records in a given file have the same coordinator key, several update record files, each associated with a unique coordinator key, can be added to the staged tables in an identifiable manner. For example, update record files that generate an error during processing, and thus are flagged "Delete" in the control table, can be purged by searching for all records in the staging area that contain the associated coordinator key. In the same manner, update files that do not generate an error, and thus are flagged "Move" in the control table, can be moved into the primary database by searching for the associated coordinator key.

In a particular embodiment of the present application, update records originally entered in an uncontrolled way, such as via a text editor, can be safety validated at update time. For example, a series of tables on the primary database may be updated by adding records to them that will be later processed by the scheduling package, CA-Jobtrac. This process, known as "Schedule Loading," runs as a batch job or a subtask of the CA-Jobtrac address space. This process reads records from a PDS member or flat file created by a client system or manually using a text editor. Since these records are entered in an uncontrolled way, the validation of these statements may not take place until the schedule load occurs. These files, which may be used repeatedly to define the jobs that will be scheduled by CA-Jobtrac, can have thousands of statements to be processed and can define thousands of database entries. When a validation failure occurs, all the definitions in the file loaded onto the staging tables are discarded in accordance with the method of the present applications. Thus, the errors can be corrected and the fields reprocessed without the need to take further corrective action to restore the primary database due to a partial load of the jobs defined in the original file. Accordingly, the present method and system are particularly useful when used in conjunction with the CA-Jobtrac application.

As noted above, one alternative method of handling validation at the time of the database update is to keep all the database entries in storage until all the records have been validated, then write all the records to the database. However, with many thousand of records possible this option can cause a strain on system resources and can cause errors when memory is not available, especially when processing large files.

The method of the current application avoids this strain on resources in processing large files by defining the set of staged tables, described above. In one example embodiment, the staged tables are structurally the same as the primary tables except that the staged tables may have an extra field to store the coordinator key. Alternatively, the primary table may be modified to also hold the coordinator key. This would enable later determination of when a given record on the primary database was updated.

An apparatus for updating a database is described in further detail with reference to FIG. 5. Apparatus 50 preferable includes a validating device 54 adapted to process the update record to determine whether there is an error in the update record and to add the update record to the staged table along with the coordinator key. Staged table generator 55 can be adapted to generate at least one staged table corresponding to at least one primary table of the database. The copying device 56 can be adapted to copy the update record from the staged table to the primary table when there is no error in the update record, and a deleting device 57 may be adapted to delete the update record from the staged table. The apparatus may optionally include an input device 52 adapted to input at least one update record and a coordinator key device 53 adapted to provide a coordinator key to identify the update record.

Figure 5:
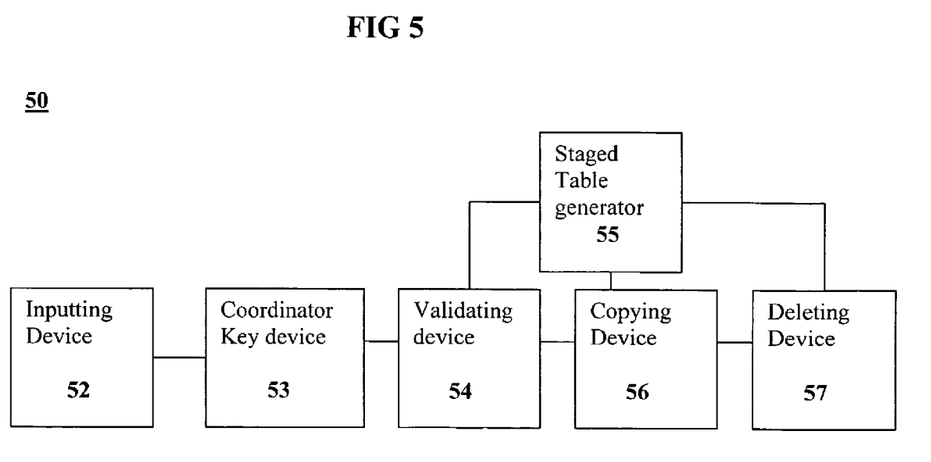
FIG. 5 shows a block diagram of an apparatus for updating a database according to an exemplary embodiment.

The apparatus is depicted in FIG. 5 and may substantially utilize the method described above with respect to FIGS. 1-4 above and thus will not be described in further detail.

Figure 6:
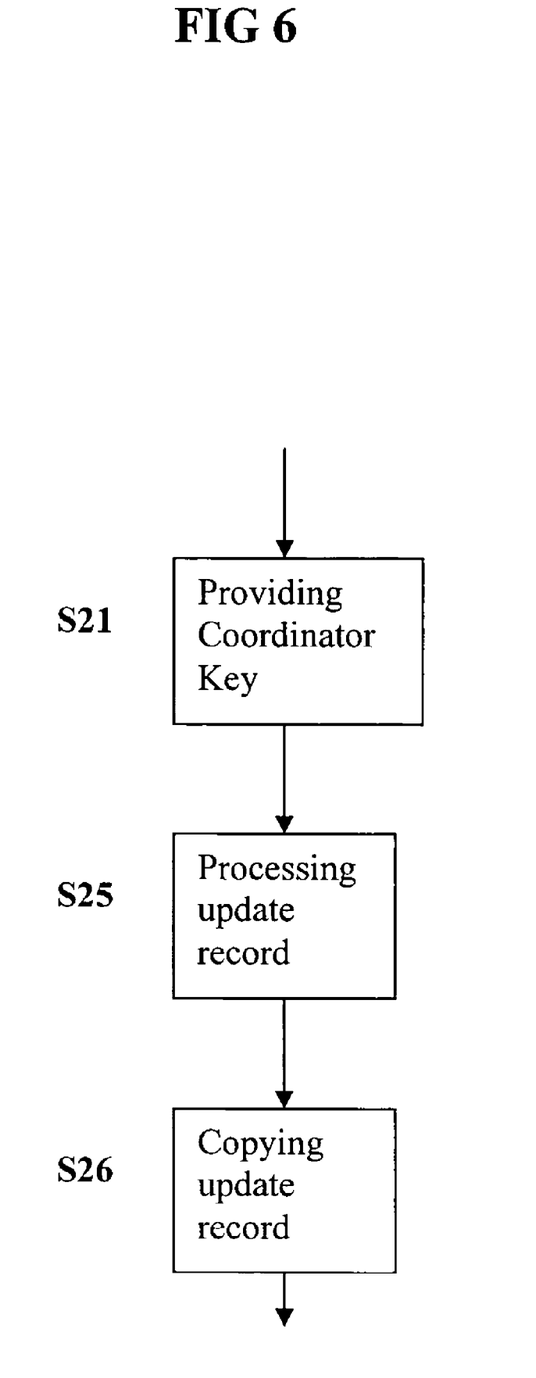
FIG. 6 shows a flow chart of a method for updating a database with one or more update records according to another exemplary embodiment of the present disclosure.

An alternative method for updating a database with one or more update records according to another exemplary embodiment of this application is discussed with reference to FIGS. 5 and 6. A coordinator key may be generated to identify one or more record updates that are input, for example, using coordinator key device 53. The update record or records may be processed, for example using validating device 54, to validate the update record, that is, check the update record for errors and to add the update record and coordinator key to a staged table. The staged table may be generated by staged table generator 55, for example. When the update record is successfully validated, that is, when the update record is error free, the update record may be copied from the staged table to the primary table using, for example, copying device 56. Only validated update records are copied to the primary table since the coordinator key may be used to identify a validated update record.

The present disclosure may be conveniently implemented using one or more conventional general purpose digital computers and/or servers programmed according to the teachings of the present disclosure. Appropriate software coding can readily be prepared based on the teachings of the present disclosure. The present disclosure may also be implemented by the preparation of application specific integrated circuits or by interconnecting an appropriate network of conventional component circuits.

The above specific embodiments are illustrative, and many variations can be introduced on these embodiments without departing from the spirit of the disclosure or from the scope of the appended claims. For example, elements and/or features of different illustrative embodiments may be combined with each and/or substituted for each other within the scope of this disclosure and appended claims.

Additional variations may be apparent to one of ordinary skill in the art from reading U.S. Provisional Application Ser. No. 60/573,060, filed May 21, 2004, the entire contents of which are incorporated herein by reference.

What is claimed is:

1. A method for updating a database with one or more update records comprising:

generating at least one staged table corresponding to at least one primary table of the database, the staged table being structurally the same as the primary table and including a plurality of update records;

adding a coordinator key for each of the plurality of update records in the staged table, the coordinator key the same for each of the plurality of records associated with an update record file;

processing an update record to validate the update record to determine whether there is an error in the update record and to add the update record to the staged table;

copying the update record from the staged table to the primary table when there is no error in the update record; and deleting the update record from the staged table.

2. A method for updating a database with one or more update records comprising:
generating at least one staged table corresponding to at least one primary table of the database, the staged table being structurally the same as the primary table and including a plurality of update records;
adding a coordinator key for each of the plurality of update records in the staged table, the coordinator key the same for each of the plurality of records associated with an update record file;
validating an update record while loading the update record to the staged table, wherein validating the update record comprises determining that there is not an error in the update record; and
in response to determining that there is not an error in the update record, copying the update record from the staged table to the primary table.

3. The method of claim 2, further comprising inputting an update record file including a plurality of update records.

4. The method of claim 3, wherein the validating step is repeated for each update record of the plurality of update records in the update record file before proceeding to the copying step, and wherein the copying step comprises copying the plurality of update records from the staged table to the primary table.

5. The method of claim 4, further comprising:
providing a coordinator key adapted to identify the update record.

6. The method of claim 5, further comprising identifying the update record to be copied to the primary table based on the coordinator key.

7. The method of claim 5, further comprising:
inputting an update record file including a plurality of update records; and
providing the same coordinator key for each update record of the plurality of record updates included in the update record file.

8. The method of claim 2, further comprising:
generating an error flag when an error is detected in the update record;
storing the error flag with the update record.

9. The method of claim 2, further comprising:
inputting an update record file including a plurality of update records;
identifying an error with respect to at least one of the plurality of update records;
processing each of the plurality of update records;
confirming the error after the processing of each of the plurality of update records; and
in response to confirming the error, generating a delete flag and associating the delete flag with the at least one of the plurality of update records.

10. The method of claim 9, further comprising adding the plurality of update records and the coordinator key to a control table.

11. The method of claim 2, further comprising:
inputting an update record file including a plurality of update records;
generating a control table storing the plurality of update records and the coordinator key;
examining the control table for the coordinator key; and
copying each update record associated with the coordinator key to the primary table.

12. The method of claim 2, further comprising:
deleting the update record from the staged table.

13. Logic for updating a database with one or more update records, the logic being embodied on a computer-readable medium and operable when executed by a computer to:
generate at least one staged table corresponding to at least one primary table of the database, the staged table being structurally the same as the primary table and including a plurality of update records;
adding a coordinator key for each of the plurality of update records in the staged table, the coordinator key the same for each of the plurality of records associated with an update record file;
validate an update record while loading the update record to the staged table, wherein validating the update record comprises determining that there is not an error in the update record; and
in response to determining that there is not an error in the update record, copy the update record from the staged table to the primary table.

14. A computer system comprising:
a processor; and
a program storage device readable by the computer system, the program storage device tangibly embodying a program of instructions executable by the processor to:
generate at least one staged table corresponding to at least one primary table of the database, the staged table being structurally the same as the primary table and including a plurality of update records;
adding a coordinator key for each of the plurality of update records in the staged table, the coordinator key the same for each of the plurality of records associated with an update record file;
validate an update record while loading the update record to the staged table, wherein validating the update record comprises determining that there is not an error in the update record; and
in response to determining that there is not an error in the update record, copy the update record from the staged table to the primary table.

15. An apparatus for updating a database with one or more update records comprises:
a staged table device operable to generate at least on staged table corresponding to at least one primary table of the database, the staged table being structurally the same as the primary table and including a plurality of update records, the staged table device further operable to add a coordinator key for each of the plurality of update records in the staged table, the coordinator key the same for each of the plurality of records associated with an update record file;
a validating device operable to validate an update record while loading the update record to the staged table, wherein validating the update record comprises determining that there is not an error in the update record; and
a copying device operable to copy the update record from the staged table to the primary table in response to determining that there is not an error in the update record.

16. The apparatus of claim 15, further comprising an input device operable to input an update record file including a plurality of update records.

17. The apparatus of claim 16, wherein:
the validating device is further operable to validate each update record of the plurality of update records in the update record file; and
the copying device is operable to copy each of the plurality of update records from the staged table to the primary table after all of the plurality of update records in the update record file are validated by the validating device.

18. The apparatus of claim 15, further comprising:
a coordinator key device operable to associate the coordinator key with the update record, the coordinator key uniquely identifying the update record.

19. The apparatus of claim 18, further comprising:
identifying the update record to be copied to the primary table based on the coordinator flag.

20. The apparatus of claim 15, further comprising:
an input device operable to input an update record file including a plurality of update records; and
a coordinator key device operable to associate a single coordinator key with each of the plurality of update records in the update record file.

21. The apparatus of claim 15, further comprising:
an error flag generator operable to generate an error flag when an error is detected in the update record; and
wherein the staged table device is further operable to store the error flag with the update record.

22. The apparatus of claim 15, further comprising:
an input device operable to input an update record file including a plurality of update records;
the validating device operable to:
identify an error with respect to at least one of the plurality of update records; and
process each of the plurality of update records;
a confirming device operable to confirm the error after the processing of each of the plurality of update records; and
a flag generator operable to generate a delete flag and associate the delete flag with the at least one of the plurality of update records in response to confirming the error.

23. The apparatus of claim 15, further comprising:
an input device operable to input an update record file including a plurality of update records; and
a control table device operable to add the plurality of update records and the coordinator key to a control table.

24. The apparatus of claim 15, further comprising:
an input device operable to input an update record file including a plurality of update records;
a coordinator key device operable to associate, with each of the plurality of update records, the coordinator key;
a control table device operable to generate a control table storing the plurality of update records and the coordinator key; and
an examining device operable to examine the control table for the coordinator key; and
wherein the copying device is further operable to each update record associated with the coordinator key to the primary table.

25. The apparatus of claim 15, further comprising:
a deleting device operable to delete the update record from the staged table.

* * * * *

UNITED STATES PATENT AND TRADEMARK OFFICE
CERTIFICATE OF CORRECTION

PATENT NO. : 8,244,675 B2  
APPLICATION NO. : 11/134030  
DATED : August 14, 2012  
INVENTOR(S) : J. Moore et al.

Page 1 of 1

It is certified that error appears in the above-identified patent and that said Letters Patent is hereby corrected as shown below:

In the Claims

At column 7, line 57 (claim 10, line 1) of the printed patent, please insert --:-- after comprising.

Signed and Sealed this  
Thirteenth Day of August, 2013

Teresa Stanek Rea  
*Acting Director of the United States Patent and Trademark Office*